(12) United States Patent
Huang et al.

(10) Patent No.: US 11,588,788 B2
(45) Date of Patent: Feb. 21, 2023

(54) SYSTEMS AND METHODS FOR FACILITATING DATA TRANSMISSION TO INTERNET OF THINGS DEVICES

(71) Applicant: Verizon Patent and Licensing Inc., Arlington, VA (US)

(72) Inventors: Ye Huang, San Ramon, CA (US); Jude M. Munn, Bay Point, CA (US); Miguel A. Carames, Long Valley, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 381 days.

(21) Appl. No.: 16/868,142

(22) Filed: May 6, 2020

(65) Prior Publication Data

US 2021/0352046 A1   Nov. 11, 2021

(51) Int. Cl.

| | |
|---|---|
| *H04L 9/40* | (2022.01) |
| *H04W 4/14* | (2009.01) |
| *H04W 12/088* | (2021.01) |
| *H04L 67/50* | (2022.01) |
| *G16Y 10/75* | (2020.01) |
| *G16Y 40/50* | (2020.01) |

(52) U.S. Cl.
CPC ........ *H04L 63/0236* (2013.01); *H04L 67/535* (2022.05); *H04W 4/14* (2013.01); *H04W 12/088* (2021.01); *G16Y 10/75* (2020.01); *G16Y 40/50* (2020.01)

(58) Field of Classification Search
CPC ...... H04L 12/088; H04L 67/535; H04W 4/14; H04W 12/088; G16Y 40/50; G16Y 10/75
See application file for complete search history.

(56) References Cited

U.S. PATENT DOCUMENTS

| | | | |
|---|---|---|---|
| 9,699,725 B1* | 7/2017 | Chamarty | H04W 52/0212 |
| 10,231,113 B1* | 3/2019 | Huang | H04W 8/04 |
| 10,506,543 B1* | 12/2019 | Edge | H04W 64/00 |
| 10,555,202 B1* | 2/2020 | Narayanan | H04W 24/10 |
| 11,071,051 B1* | 7/2021 | Huang | H04W 24/02 |
| 2014/0330952 A1* | 11/2014 | Starsinic | H04W 12/35 709/223 |
| 2016/0286385 A1* | 9/2016 | Ryu | H04W 68/00 |
| 2017/0332421 A1* | 11/2017 | Sternberg | H04W 76/11 |
| 2018/0054799 A1* | 2/2018 | Starsinic | H04W 68/02 |
| 2018/0077681 A1* | 3/2018 | Leroux | H04W 68/02 |
| 2018/0124544 A1* | 5/2018 | Gupta | H04L 41/082 |
| 2018/0220256 A1* | 8/2018 | Kotecha | H04W 4/70 |
| 2018/0227699 A1* | 8/2018 | Kim | H04W 8/02 |

(Continued)

*Primary Examiner* — Melanie Jagannathan

(57) ABSTRACT

A device may receive provisioning data identifying an application server and a user equipment. The device may provide a request for reachability data associated with the user equipment and may receive the reachability data. The device may cause a trigger for a packet and data identifying the application server to be provided to the user equipment. The device may receive, from the user equipment, the packet that includes a network address and a port identifier of a port of the user equipment. The device may provide, to a firewall associated with the application server, an identifier, the network address, and the port identifier. The device may cause, via the firewall, the reachability data, the network address, and the port identifier to be provided to the application server to enable the application server to provide data to the user equipment.

20 Claims, 10 Drawing Sheets

(56) References Cited

U.S. PATENT DOCUMENTS

| | | | | |
|---|---|---|---|---|
| 2019/0058690 | A1* | 2/2019 | Huang | H04L 61/2517 |
| 2019/0110241 | A1* | 4/2019 | Jain | H04W 4/70 |
| 2019/0166016 | A1* | 5/2019 | Livanos | H04L 67/55 |
| 2019/0253875 | A1* | 8/2019 | Vittal | H04W 8/24 |
| 2019/0313468 | A1* | 10/2019 | Talebi Fard | H04W 76/12 |
| 2019/0364541 | A1* | 11/2019 | Ryu | H04W 80/10 |
| 2020/0068047 | A1* | 2/2020 | Huang | H04L 67/141 |
| 2020/0196101 | A1* | 6/2020 | Edge | H04W 64/00 |
| 2020/0275257 | A1* | 8/2020 | Gupta | H04W 24/08 |
| 2020/0275350 | A1* | 8/2020 | Kodaypak | H04W 8/08 |
| 2020/0366577 | A1* | 11/2020 | Sapra | H04W 64/003 |
| 2021/0160680 | A1* | 5/2021 | Velev | H04W 8/005 |
| 2021/0219238 | A1* | 7/2021 | Sharma | G16Y 10/75 |

* cited by examiner

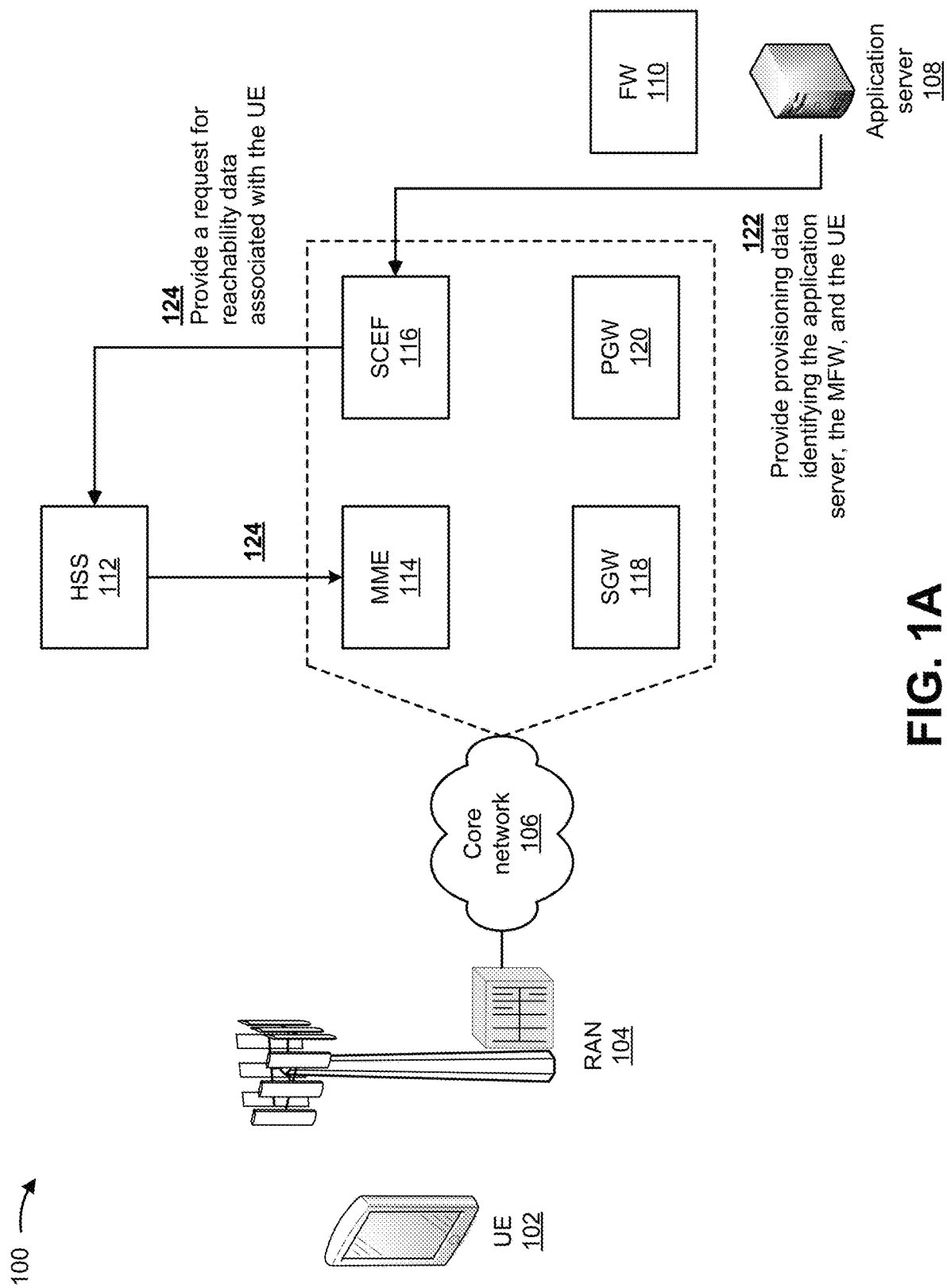

US 11,588,788 B2

SYSTEMS AND METHODS FOR FACILITATING DATA TRANSMISSION TO INTERNET OF THINGS DEVICES

BACKGROUND

Internet of Things (IoT) devices are intended to be long lasting and utilize low power consumption. To maximize life cycle, an IoT device may enter power saving mode (PSM) and/or extended discontinuous reception (eDRX) periods where the IoT device is typically not reachable. During these unreachable periods, an application server, wishing to communicate with the IoT device may be unable to send data and/or updates. A device, such as a service capability exposure function (SCEF), may communicate with other devices within a low-power wide-area network (LPWAN) to transmit data.

BRIEF DESCRIPTION OF THE DRAWINGS

FIGS. 1A-1F are diagrams of one or more example implementations described herein.

DETAILED DESCRIPTION OF PREFERRED EMBODIMENTS

Figure 1B:
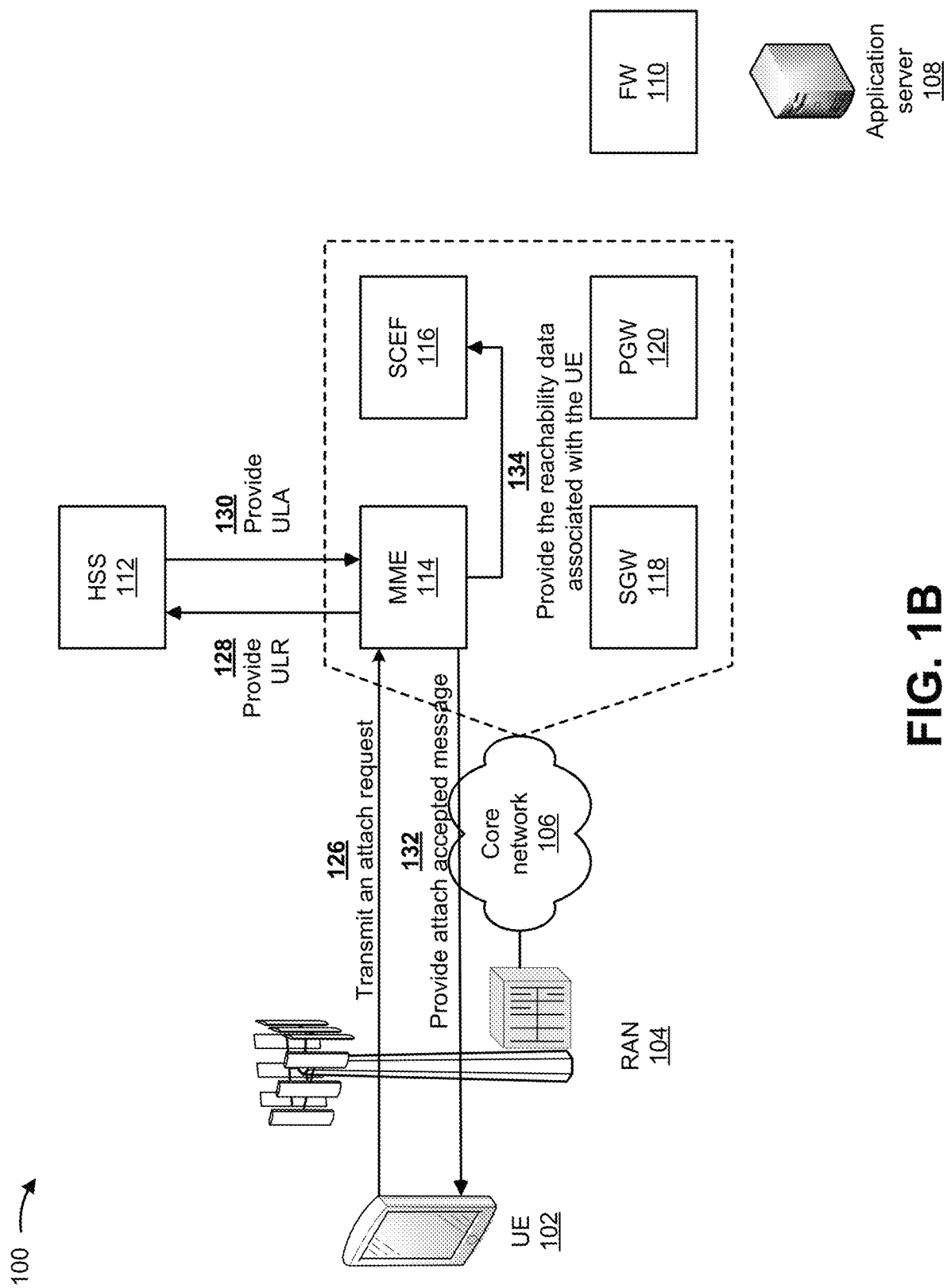
Figure 1C:
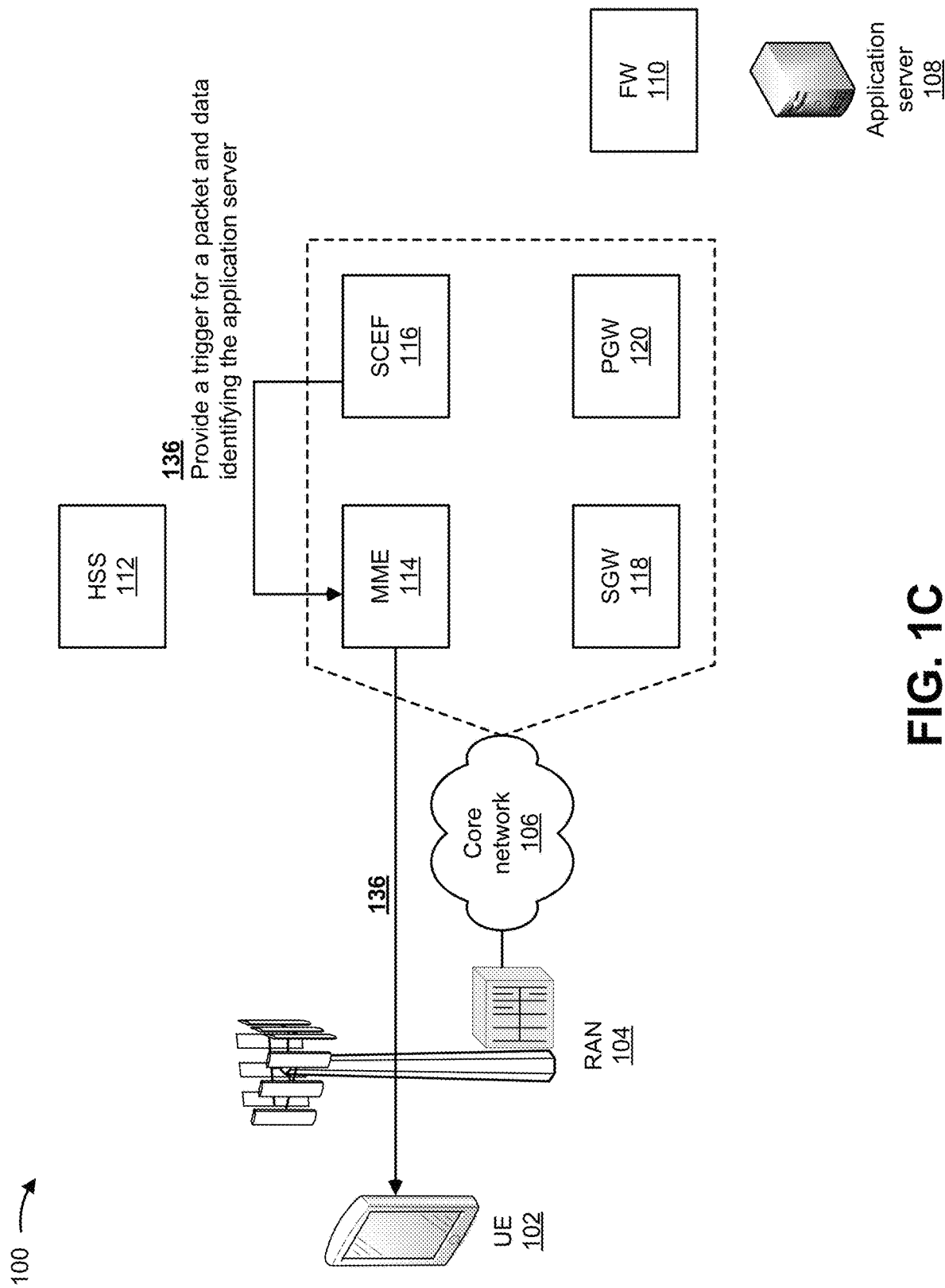

The following detailed description of example implementations refers to the accompanying drawings. The same reference numbers in different drawings may identify the same or similar elements.

Internet of Things (IoT) devices may be configured to self-regulate by transmitting packets of data based on sensed conditions. By automating tasks that would otherwise require human monitoring and/or involvement, the IoT devices may improve efficiency and reliability across a wide variety of applications, such as home appliances, utilities, healthcare equipment, transportation, and/or the like. However, because many IoT devices run on batteries or have limited and finite power supplies, the useful life of the IoT devices may be limited by battery life. With billions of IoT devices in the world, battery replacement may be enormously costly and ultimately negate the benefits of the service provided to the end user.

To reduce power consumption, an IoT device may be configured to have extended discontinuous reception (eDRX) and/or a power saving mode (PSM). eDRX extends battery life of the IoT device by momentarily switching off a receive chain of a radio module. PSM extends battery life even further by enabling the IoT device to set sleep intervals during which time the radio module may not be contacted by the network. Whether using eDRX, PSM, or a combination of both, the IoT device may conserve power that might otherwise be wasted by more frequently communicating with the network. By doing so, the IoT device may last significantly longer on a single limited power source.

While the IoT device, as configured with eDRX and/or PSM, may have lower power consumption, the IoT device may also have lower reachability. A server providing an application (e.g., an IoT service, and/or the like) to a network may be unaware that the IoT device is unreachable but may, nonetheless, wish to reach the IoT device. As a result, the application server may waste computing resources (e.g., processing resources, memory resources, communication resources, and/or the like) and/or networking resources attempting to transmit data to the IoT device while the IoT device is unreachable. In some instances, a packet data network (PDN) session may time out due to the IoT device being unreachable for a particular time period. As a result, the network may assign the IoT device a new Internet protocol (IP) address upon retry, which may further exacerbate data delivery issues.

Some implementations described herein provide a device (e.g., an exposure function device, such as a service capability exposure function (SCEF), a network exposure function (NEF), and/or the like) that facilitates data transmission from an application server to a user equipment (UE) (e.g., an IoT device). For example, the exposure function device may receive provisioning data identifying an application server and an IoT device. The exposure function device may provide, to a network device (e.g., a mobility management entity device (MME), a home subscriber server (HSS), an access and mobility management function AMF), and/or the like), a request for reachability data associated with the IoT device. The exposure function device may receive, from the network device, the reachability data associated with the IoT device based on the request for the reachability data. The exposure function device may cause a trigger for a packet, such as a ping packet, and data identifying the application server to be provided to the IoT device. The exposure function device may receive, from the IoT device, the packet that includes a network address and a port identifier of a port of the IoT device to be utilized by the application server. The exposure function device may provide, to a firewall (e.g., a managed firewall) associated with the application server, an identifier (e.g., a UE identifier, a port identifier, etc.) or a network address to be utilized by the application server. The exposure function device may provide, via e.g., the firewall, the reachability data associated with the IoT device, the network address of the IoT device, and the port identifier of the port of the IoT device to the application server to enable the application server to provide data to the IoT device.

By communicating with the application server regarding whether the IoT device is reachable at a particular time, the exposure function device may more effectively and efficiently facilitate data transmission from the application server to the IoT device. As a result, the exposure function device may conserve computing resources (e.g., processing resources, memory resources, communication resources, and/or the like) and/or networking resources that might otherwise be wasted by the application server attempting to transmit data to the IoT device while the IoT device is unreachable, and/or the like. Additionally, the exposure function device may prevent PDN session timeouts and associated data delivery issues.

FIGS. 1A-1F are diagrams of one or more example implementations 100 described herein. As shown in FIGS. 1A-1F, a user equipment (UE) 102 (e.g., an IoT device) may be associated with a radio access network (RAN) 104. The RAN 104 may be associated with a core network 106, an application server 108, a firewall (FW) 110, a home subscriber server (HSS) 112, and/or the like. The RAN 104 may include a base station with one or more radio transmitters. The core network 106 may include an example architecture of a low-power wide-area network (LPWAN) (e.g., a narrow band internet of things (NB-IoT) network, a Sigfox network, a long range (LoRa) network, an LTE-M network, an LTE-M1 network, and/or the like).

The core network 106 may include physical elements, virtual elements, or a combination of physical and virtual elements. The application server 108 may include an application server device that provides application data (e.g., associated with an application) to the UE 102 and/or receives data from the UE 102. The FW 110 may include a security device that processes and/or filters data for the application server 108. The HSS 112 may include a server device that maintains user equipment profiles, including subscription information associated with the UE 102, information about a physical location of the UE 102, and/or the like.

While a process relating to facilitating data transmission to the UE 102 is described below with respect to a fourth generation (4G) network, the process may be implemented within a fifth generation (5G) network, or another type of network. Further details regarding components of the 5G network are provided below in connection with FIG. 2B.

Further, while the description with regard to FIGS. 1A-1F describes use of an exposure function in the form of a service capability exposure function (SCEF), the description equally applies to other types of exposure functions in other types of networks, such as a network exposure function (NEF) in a 5G network, and/or the like.

As shown in FIGS. 1A-1F, the core network 106 may include a mobility management entity (MME) 114, an SCEF 116, a serving gateway (SGW) 118, a packet data network gateway (PGW) 120, and/or the like. The MME 114 may include a main control node that is responsible for tracking, paging, and authenticating the UE 102. The SCEF 116 may include a gateway interface that securely exposes and/or discovers services and capabilities provided by other network interfaces. The SGW 118 may include a data transfer device that processes and/or transfers data between the MME 114 and the PGW 120. The PGW 120 may include a data transfer device that processes and/or transfers data between the SGW 118 and a data network.

In FIG. 1A, assume that the UE 102 has registered with the application server 108 to execute an application (e.g., an IoT application, and/or the like). To do so, the UE 102 may transmit a request for registration, including identifying information about the UE 102 (e.g., a customer identifier of a customer associated with the UE 102, an identifier of the UE 102, and/or the like), to the application server 108. Upon receipt of the request for registration, the application server 108 may authenticate the UE 102 and store the identifying information in a data structure for later access.

In FIG. 1A, assume further that the SCEF 116, as implemented within the core network 106, has provided one or more configuration instructions to the application server 108 to allow the SCEF 116 to assist with data transmission to the UE 102. By doing so, the SCEF 116 may prevent the application server 108 from blindly sending data at times when the UE 102 is unreachable, which wastes networking and/or computing resources. The one or more configuration instructions may indicate that the application server 108 is to provide provisioning data to the SCEF 116 as part of a process that the application server 108 performs for scheduling to transmit data to the UE 102 (e.g., to perform a software update, to perform a diagnostics test, and/or the like). The provisioning data may identify the application server 108, the FW 110, and the UE 102 to the SCEF 116. For example, the provisioning data may include an identifier of the application server 108, a port identifier of a port of the application server 108, an identifier of the FW 110, the customer identifier of the customer associated with the UE 102, the identifier of the UE 102, and/or the like.

In accordance with the one or more configuration instructions, the application server 108 may provide the provisioning data identifying the application server 108, the FW 110, and/or the UE 102 to the SCEF 116, as shown by reference number 122 in FIG. 1A. To provide the provisioning data to the SCEF 116, the application server 108 may transmit the provisioning data to the SCEF 116 via one or more application programming interfaces (APIs), via a communication addressed to a network address of the SCEF 116, and/or the like. By doing so, the application server 108 may trigger a sequence of communications within the core network 106 to coordinate and enable data transmission to the UE 102.

After receiving the provisioning data, the SCEF 116 may provide a request for reachability data associated with the UE 102 to the HSS 112, as shown by reference number 124. The reachability data may include a power saving mode (PSM) schedule (e.g., a first timer value, a second timer value, and/or the like), an extended discontinuous reception (eDRX) schedule (e.g., a paging time window (PTW), an eDRX cycle length, and/or the like), a current reachability status of the UE 102, a last reachable date and/or time associated with the UE 102, a next reachable date and/or time associated with the UE 102, a last disconnect date and/or time associated with the UE 102, a next disconnect date and/or time associated with the UE 102, and/or the like. Because the HSS 112 contains additional identifying information about the UE 102, the HSS 112 may enable communication with the UE 102. For example, the HSS 112 may access a user profile associated with the UE 102 and transmit the additional identifying information, along with the request for the reachability data (e.g., as shown by reference number 124), to the MME 114.

The MME 114, as the main control node within the core network 106, may be configured to obtain the reachability data. The MME 114 may obtain the reachability data associated with the UE 102 during an attachment procedure. For example, as shown in FIG. 1B, the UE 102 may attach to the core network 106. To do so, as shown by reference number 126, the UE 102 may transmit an attach request to the MME 114. As part of the attach request, the UE 102 may request eDRX parameters, including a PTW and/or an eDRX cycle length, to implement an eDRX configuration. Additionally, or alternatively, the UE 102 may request PSM parameters, including a first timer value and/or a second timer value, to implement a PSM configuration. The first timer value may define a time that the UE 102 remains reachable following attachment to the core network 106. The second timer value may be a tracking area update (TAU) timer, according to which the UE 102 notifies the MME 114 of reachability of the UE 102.

The MME 114, in response to the attach request, may engage in an update location request (ULR) and an update location answer (ULA) exchange with the HSS 112 (e.g., as shown by reference numbers 128 and 130, respectively) in order to assess a subscription associated with the UE 102 (e.g., determine whether the subscription is paid-to-date, determine whether the subscription permits certain types of services, and/or the like) and authorize the UE 102. After authorizing the UE 102 and determining and storing the eDRX and/or PSM parameters and as shown by reference number 132, the MME 114 may provide an attach accepted message to the UE 102. The attach accepted message may include the eDRX parameters (e.g., the PTW, the eDRX cycle length, and/or the like) to define the eDRX schedule and/or the PSM parameters (e.g., the first timer value, the second timer value, and/or the like) to define the PSM schedule. The UE 102 may finalize attachment by transmitting a UE attach complete message to the MME 114.

In some implementations, the MME 114 may obtain the reachability data associated with the UE 102 during a TAU procedure. For example, after the UE 102 and the MME 114 have negotiated the eDRX configuration and/or the PSM configuration, the UE 102 may move into a different tracking area while the UE 102 is unreachable. Upon waking, the UE 102 may transmit a TAU request to the MME 114 to provide updated location information. Similar to the attach request, the TAU request may include a request for updated eDRX parameters (e.g., an updated PTW window, an updated eDRX cycle, and/or the like) and/or updated PSM parameters (e.g., an updated first timer value, an updated second timer value, and/or the like). After determining and storing the updated PTW, the updated eDRX cycle, the updated first timer value, and/or the updated second timer value, the MME 114 may provide a TAU accepted message to the UE 102. The TAU accepted message may include the updated eDRX parameters to update the eDRX schedule and/or the updated PSM parameters to update the PSM schedule.

Over time, the MME 114 may compile and store information relating to the eDRX configuration and/or the PSM configuration to define the reachability data. For example, based on current and historical information of the UE 102, the MME 114 may store the PSM schedule, the eDRX schedule, the current reachability status of the UE 102, the last reachable date and/or time associated with the UE 102, the next reachable date and/or time associated with the UE 102, the last disconnect date and/or time associated with the UE 102, the next disconnect date and/or time associated with the UE 102, and/or the like. In response to the request for the reachability data, the MME 114 may access the reachability data and, as shown by reference number 134, may provide the reachability data associated with the UE 102 to the SCEF 116. By understanding when the UE 102 is capable of receiving data, the SCEF 116 may be able to assist with coordinating timing of data transmission to the UE 102 and conserve networking and/or computing resources that might otherwise be wasted attempting to transmit the data while the UE 102 is unreachable.

After receiving the reachability data from the MME 114, the SCEF 116 may assess the reachability data to determine a time (e.g., during a reachable time window of the UE 102, and/or the like) to communicate with the UE 102 to obtain UE identifying information for communicating with the UE 102. At the determined time, the SCEF 116 may provide, to the UE 102 and via the MME 114, a trigger for a packet and data identifying the application server, as is shown by reference number 136 in FIG. 1C. The trigger for the packet may include an access point name (APN), information identifying the PGW 120 and an associated packet data network (PDN), and/or the like.

Figure 1D:
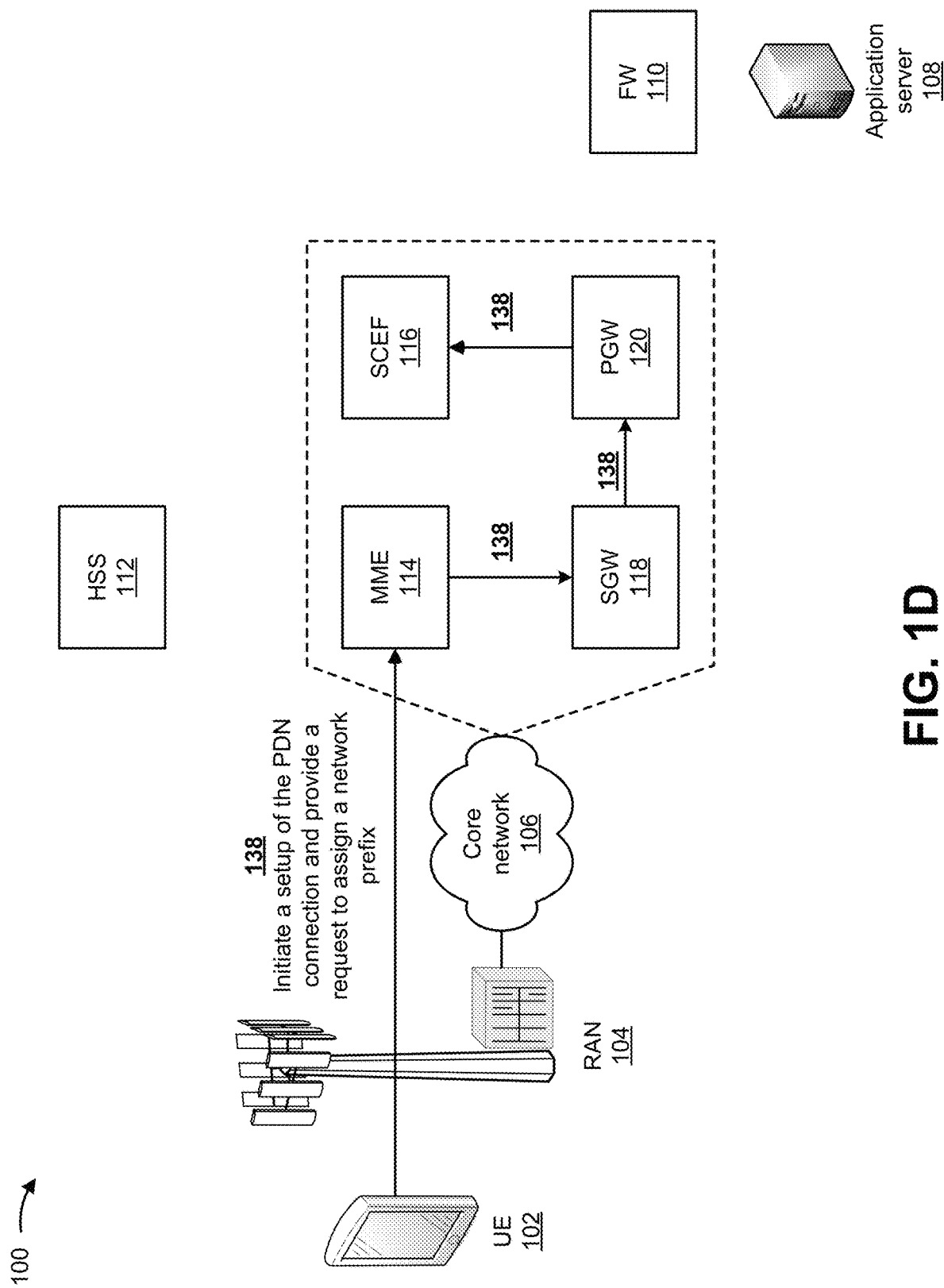

Based on the trigger for the packet and the data identifying the application server, the UE 102 may initiate a setup of a PDN connection and provide, to the SCEF 116, a request to assign a network prefix for the UE 102, as is shown by reference number 138 in FIG. 1D. The network prefix may be an IP version four (IPv4) prefix, an IP version six (IPv6) prefix, or a prefix for another IP version. To initiate the setup of the PDN connection, the UE 102 may transmit a request for the PDN connection to the MME 114. The MME 114 may send the request to the SGW 118 and the PGW 120, associated with the UE 102, to cause the SGW 118 and the PGW 120 to initiate or establish the PDN connection between the UE 102 and the application server 108. In some implementations, the MME 114 may request that the SGW 118 create a tunnel, such as a general packet radio service (GPRS) tunnel protocol (GTP) tunnel, to the PGW 120 to establish a path between the application server 108 and the UE 102.

As further shown by reference number 138, the UE 102 may provide the request for the network prefix to the SCEF 116 by transmitting the request via the MME 114, the SGW 118, and the PGW 120. In some implementations, the MME 114 may provide the request to assign the network prefix directly to the SCEF 116 (e.g., without going through the SGW 118 or the PGW 120). In response to receiving the request, the SCEF 116 may assign a network prefix to the UE 102. To assign the network prefix, for example, the SCEF 116 may determine a network (e.g., a subnetwork) with which the UE 102 is associated and assign the UE 102 a network prefix associated with that network. If the UE 102 is associated with a network that has not been previously assigned a network prefix, then the SCEF 116 may assign a new network prefix to the network and use that new network prefix for the UE 102. The SCEF 116 may transmit the assigned network prefix to the UE 102.

Figure 1E:
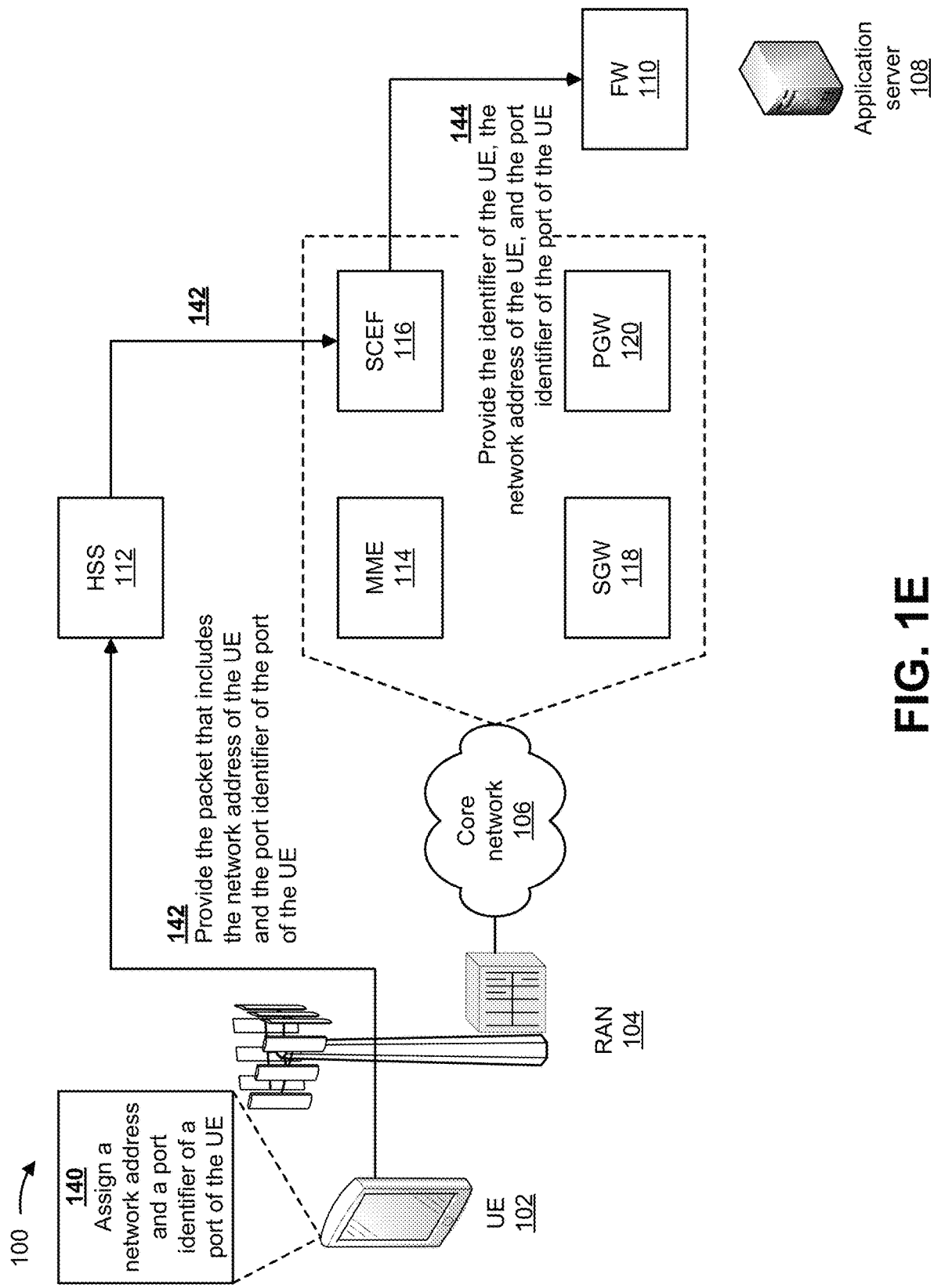
Figure 1F:
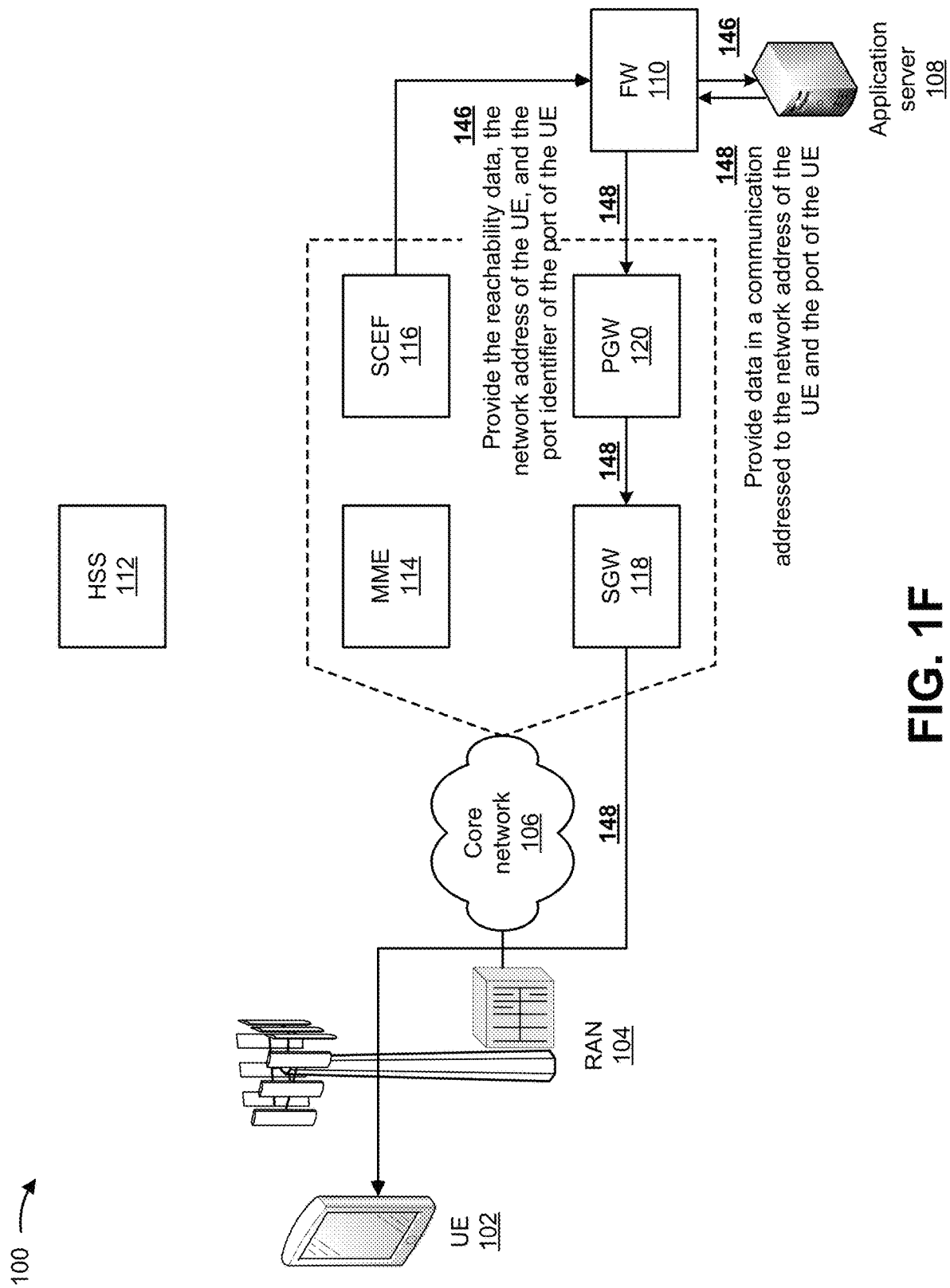

Based on the trigger for the packet, and as is shown by reference number 140 in FIG. 1E, the UE 102 may assign a network address (e.g., an IP address incorporating the IPv4 prefix, the IPv6 prefix, the prefix of another version of IP, and/or the like) of the UE 102 and a port identifier of a port of the UE 102 to be utilized by the application server 108. As shown by reference number 142, the UE 102 may provide to the SCEF 116, via the HSS 112, the packet that includes the network address of the UE 102 and the port identifier of the port of the UE 102 to be utilized by the application server 108. To provide the packet, the UE 102 may generate and provide a short message service (SMS) message, one or more network packets, a message, and/or the like.

After receiving the packet from the UE 102, and as shown by reference number 144, the SCEF 116 may provide the identifier of the UE 102, the network address of the UE 102, and the port identifier of the port of the UE 102 to the FW 110. To do so, the SCEF 116 may update a dynamic domain name system (DDNS) data structure, associated with the FW 110, with the identifier of the UE 102, the network address of the UE 102, and/or the port identifier of the port of the UE 102 to be utilized by the application server 108. By updating the DDNS data structure as such, the SCEF 116 may allow the FW 110 to selectively open one or more pinholes in the FW 110 for data transmission from the application server 108 to the UE 102. As shown by reference number 146 in FIG. 1F, the SCEF 116 may provide, to the application server 108 and via the FW 110, the reachability data associated with the UE 102, the network address of the UE 102, and the port identifier of the port of the UE 102 in order to enable the application server 108 to provide data to the UE 102.

After receiving the reachability data associated with the UE 102 and the UE identifying information for communicating with the UE 102 (e.g., the network address of the UE 102, the port identifier of the port of the UE 102, and/or the like), the application server 108 may determine a time window to transmit data to the UE 102. For example, the application server 108 may determine that the reachability data indicates that the UE 102 is awake and ready to receive the data from the application server 108 at a particular time. In such a case, as shown by reference number 148, the UE 102 may provide the data in a communication addressed to the network address and the port of the UE 102 at the particular time. The application server 108 may provide the data by transmitting the data through the one or more pinholes within the FW 110 and along the PDN connection (e.g., via the PGW 120 and the SGW 118). Alternatively, the application server 108 may determine that the reachability data indicates that the UE 102 is unreachable and unable to receive data from the application server 108 at the particular time. In such a case, the application server 108 may refrain from providing the data to the UE 102 and instead wait until a later time when the UE 102 is set to be awake (e.g., as indicated by the PSM schedule, the eDRX schedule, the next reachable date and/or time associated with the UE 102, and/or the like).

By assisting the application server 108 in obtaining the reachability data and the UE identifying information, the SCEF 116 may conserve computing resources and/or networking resources that might otherwise be wasted by the application server attempting to transmit data to the UE 102 when the UE 102 is unreachable, the application server 108 handling customer services issues as a result of the UE 102 being unable to receive the data transmitted by the application server 108, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2A:
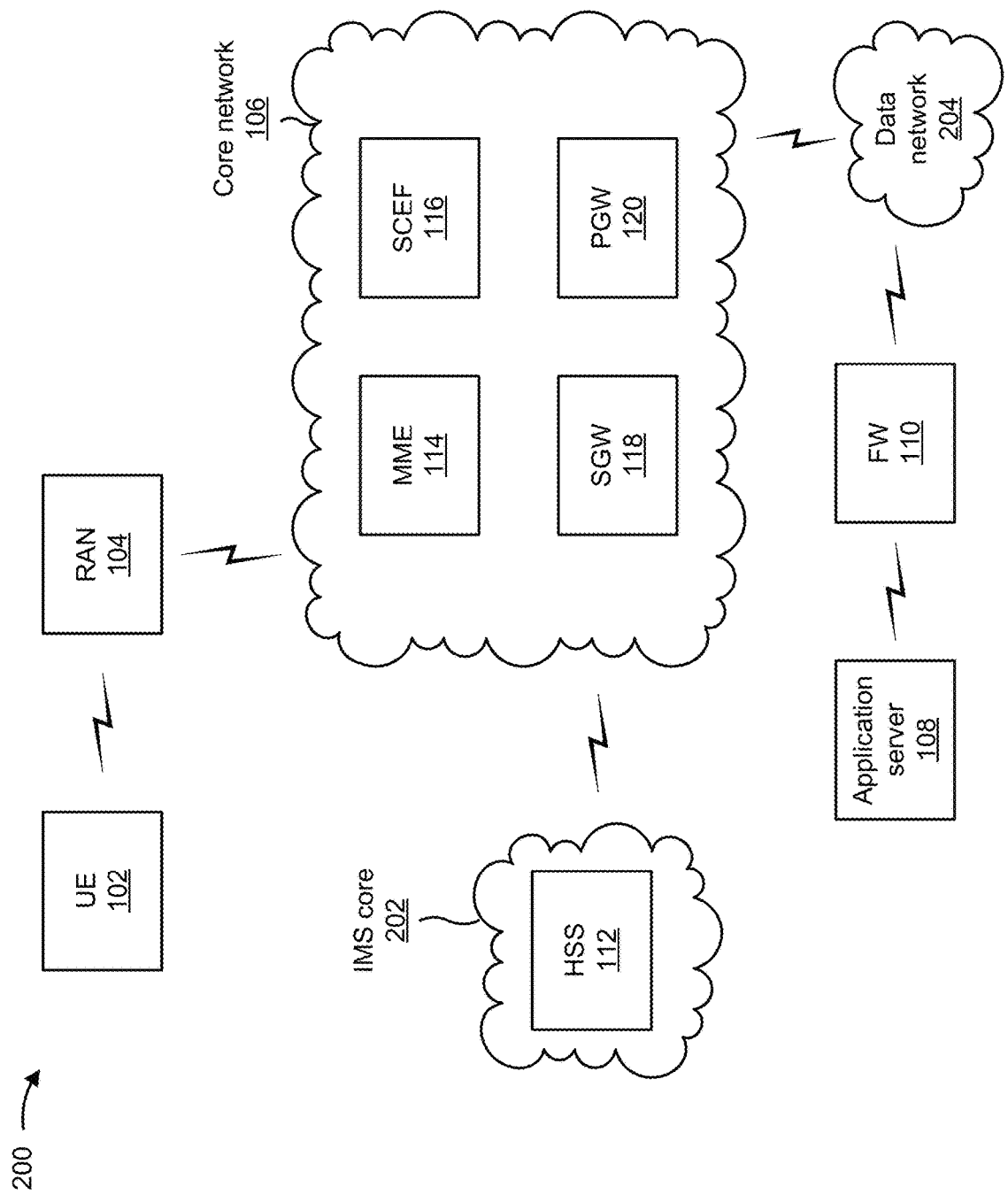
FIGS. 2A-2B are diagrams of one or more example environments in which systems and/or methods described herein may be implemented.
Figure 2B:
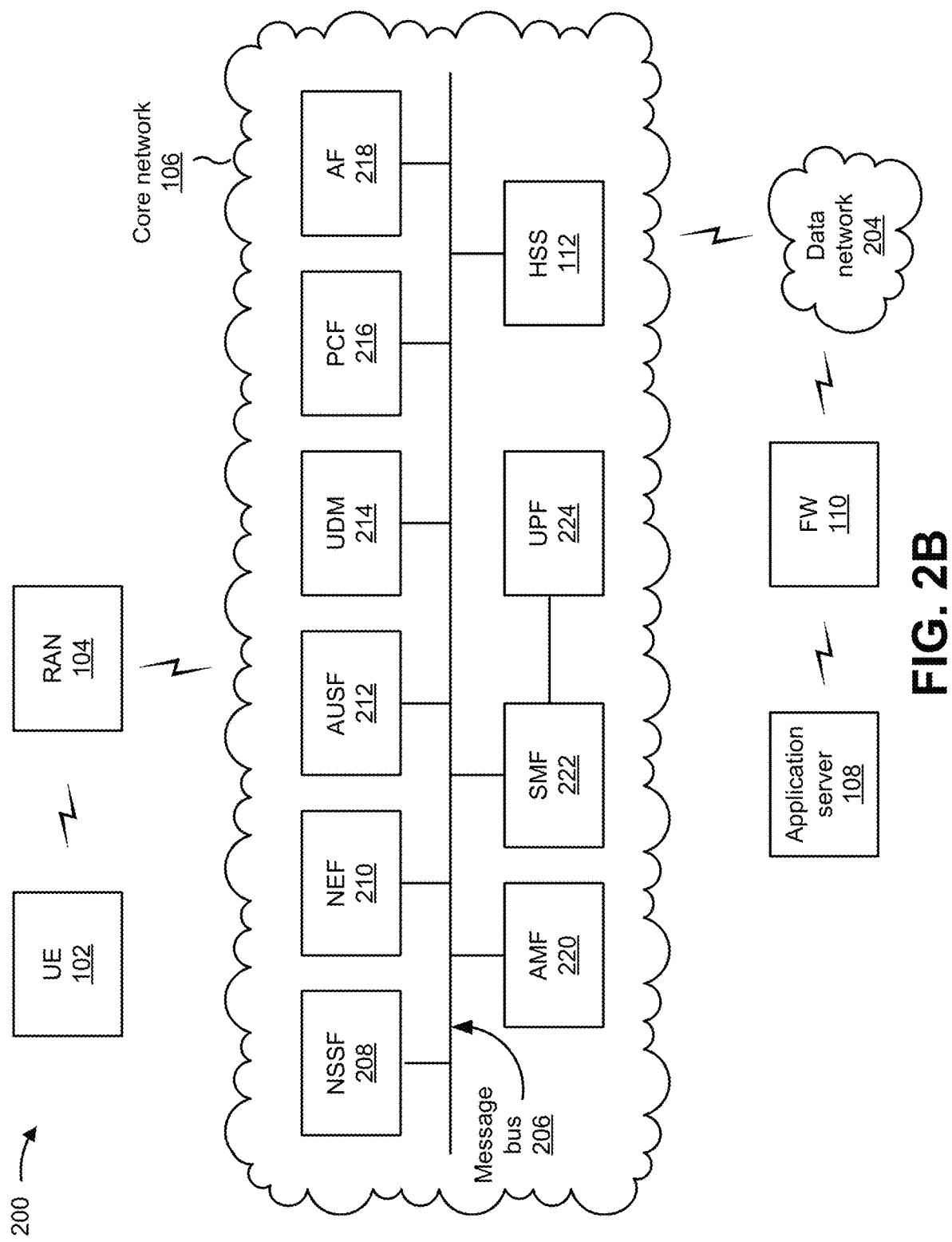

FIGS. 2A-2B are diagrams of one or more example environments 200 in which systems and/or methods described herein may be implemented. As shown in FIG. 2A, example environment 200, which may include a 4G architecture, may include UE 102, RAN 104, core network 106, application server 108, FW 110, internet protocol (IP) multimedia subsystem (IMS) core 202, and data network 204. As shown in FIG. 2B, example environment 200, which may include a 5G architecture, may include UE 102, RAN 104, core network 106, application server 108, FW 110, and data network 204. Devices and/or networks of example environment 200 may interconnect via wired connections, wireless connections, or a combination of wired and wireless connections.

UE 102 includes one or more devices capable of receiving, generating, storing, processing, and/or providing information, such as information described herein. For example, UE 102 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, an autonomous vehicle, or a similar type of device.

RAN 104 may support, for example, a cellular radio access technology (RAT). RAN 104 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and one or more other network entities that may support wireless communication for UE 102. RAN 104 may transfer traffic between UE 102 (e.g., using a cellular RAT), base stations (e.g., using a wireless interface or a backhaul interface, such as a wired backhaul interface), and/or core network 106. RAN 104 may provide one or more cells that cover geographic areas.

RAN 104 may perform scheduling and/or resource management for UE 102 covered by RAN 104 (e.g., UE 102 covered by a cell provided by RAN 104). In some implementations, RAN 104 may be controlled or coordinated by a network controller, which may perform load balancing, network-level configuration, and/or the like. The network controller may communicate with RAN 104 via a wireless or wireline backhaul. In some implementations, RAN 104 may include a network controller, a self-organizing network (SON) module or component, or a similar module or component. In other words, RAN 104 may perform network control, scheduling, and/or network management functions (e.g., for uplink, downlink, and/or sidelink communications of UE 102 covered by RAN 104).

Core network 106 may include an evolved packet core (EPC) network that operates based on a third generation partnership project (3GPP) wireless communication standard. In the example of FIG. 2A, core network 106 may include MME 114, SCEF 116, SGW 118, and PGW 120. In the example of FIG. 2B, core network 106 may include a network slice selection function (NSSF) 208, a network exposure function (NEF) 210, an authentication server function (AUSF) 212, a unified data management (UDM) 214, a policy control function (PCF) 216, an application function (AF) 218, an access and mobility management function (AMF) 220, a session management function (SMF) 222, a user plane function (UPF) 224, and HSS 112. Elements of core network 106 may interconnect via a message bus 206, as further shown in FIG. 2B. HSS 112 may reside in core network 106 and/or the IMS core 202. The IMS core 202 may manage device registration and authentication, session initiation, and/or the like, associated with UE 102.

Application server 108 includes one or more devices capable of receiving, generating, storing, processing, and/or providing information, such as information described herein. For example, application server 108 may include a laptop computer, a tablet computer, a desktop computer, a server device or a group of server devices, or a similar type of device. Application server 108 may receive information from and/or transmit information to UE 102, data network 204, and/or core network 106.

FW 110 includes one or more devices capable of processing and/or transferring traffic between endpoint devices. For example, FW 110 may include a security device, such as a firewall, a router, a gateway, a switch, a hub, a bridge, a reverse proxy, a server (e.g., a proxy server), an intrusion detection device, a load balancer, and/or the like. FW 110 may be positioned between application server 108 and data network 204 and/or core network 106.

HSS 112 includes one or more devices, such as one or more server devices, capable of managing (e.g., receiving, generating, storing, processing, providing, and/or the like) information associated with UE 102. For example, HSS 112 may manage subscription information associated with UE 102, such as information associated with a subscriber profile of a user associated with UE 102, information associated with services and/or applications that are accessible to UE 102, location information associated with UE 102, a network identifier (e.g., a network address) associated with UE 102, information associated with a treatment of UE 102 (e.g., quality of service information, a quantity of minutes allowed per time period, a quantity of data consumption allowed per time period, and/or the like), and/or the like. HSS 112 may provide this information to one or more other devices of environment 200 to support the operations performed by those devices.

MME 114 includes one or more devices, such as one or more server devices, capable of managing authentication, activation, deactivation, and/or mobility functions associated with UE 102. MME 114 may perform operations relating to authentication of UE 102. Additionally, or alternatively, MME 114 may facilitate the selection of a particular SGW and/or a particular PGW to serve traffic to and/or from UE 102. MME 114 may perform operations associated with handing off UE 102 from a first RAN 104 to a second RAN 104 when UE 102 is transitioning from a first cell associated with the first RAN 104 to a second cell associated with the second RAN 104. Additionally, or alternatively, MME 114 may select another MME (not shown), to which UE 102 should be handed off (e.g., when UE 102 moves out of range of MME 114).

SCEF 116 includes one or more devices that receive, store, generate, determine, provide, and/or the like information. For example, SCEF 116 may include a server device or a group of server devices. SCEF 116 may perform one or more actions performed by a network exposure function (NEF) and/or a network repository function (NRF).

SGW 118 includes one or more devices capable of routing packets. For example, SGW 118 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. SGW 118 may aggregate traffic received from one or more RANs 104, and may send the aggregated traffic to data network 204 (e.g., via PGW 120) and/or other network devices associated with core network 106 and/or the IMS core 202. SGW 118 may also receive traffic from data network 204 and/or other network devices, and may send the received traffic to UE 102 via RAN 104. Additionally, or alternatively, SGW 118 may perform operations associated with handing off UE 102 to and/or from an LTE network.

PGW 120 includes one or more devices capable of providing connectivity for UE 102 to external packet data networks (e.g., other than the depicted core network 106). For example, PGW 120 may include one or more data processing and/or traffic transfer devices, such as a gateway, a router, a modem, a switch, a firewall, a NIC, a hub, a bridge, a server device, an OADM, or any other type of device that processes and/or transfers traffic. PGW 120 may aggregate traffic received from one or more SGWs 118, and may send the aggregated traffic to data network 204. Additionally, or alternatively, PGW 120 may receive traffic from data network 204, and may send the traffic to UE 102 via SGW 118 and RAN 104. PGW 120 may record data usage information (e.g., byte usage).

Data network 204 includes one or more wired and/or wireless data networks. For example, data network 204 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

Message bus 206 represents a communication structure for communication among the elements of core network 106. In other words, message bus 206 may permit communication between two or more elements of core network 106.

NSSF 208 may select network slice instances for UEs, where NSSF 208 may determine a set of network slice policies to be applied at the RAN 104. By providing network slicing, NSSF 208 allows an operator to deploy multiple substantially independent end-to-end networks potentially with the same infrastructure. In some implementations, each slice may be customized for different services. NEF 210 may support the exposure of capabilities and/or events in the wireless telecommunications system to help other entities in the wireless telecommunications system discover network services and/or utilize network resources efficiently. The NEF 210 may perform one or more functions performed by the SCEF 116.

AUSF 212 may act as an authentication server and support the process of authenticating UEs in the wireless telecommunications system. UDM 214 may store subscriber data and profiles in the wireless telecommunications system. UDM 214 may be used for fixed access, mobile access, and/or the like, in core network 106. UDM 214 may provide platform information (e.g., UPF information and/or SMF information) to HSS 112. PCF 216 may provide a policy and charging framework that incorporates network slicing, roaming, packet processing, mobility management, and/or the like.

AF 218 may determine whether UEs provide preferences for a set of network slice policies and support application influence on traffic routing, access to NEF 210, policy control, and/or the like. AMF 220 may provide authentication and authorization of UEs. SMF 222 may support the establishment, modification, and release of communications sessions in the wireless telecommunications system. For example, SMF 222 may configure traffic steering policies at UPF 224, enforce UE IP address allocation and policies, and/or the like. AMF 220 and SMF 222 may act as a termination point for Non-Access Stratum (NAS) signaling, mobility management, and/or the like. SMF 222 may act as a termination point for session management related to NAS. SMF 222 may provide platform information (e.g., UPF information and/or SMF information) to UDM 214 to permit UDM 214 to provide the platform information to HSS 112. RAN 104 can send information (e.g., the information that identifies the UE) to AMF 220 and/or SMF 222 via PCF 216.

UPF 224 may serve as an anchor point for intra/inter RAT mobility. UPF 224 may apply rules to packets, such as rules pertaining to packet routing, traffic reporting, handling user plane QoS, and/or the like. UPF 224 may determine an attribute of application-specific data that is communicated in a communications session. UPF 224 may receive information (e.g., the information that identifies the communications attribute of the application) from RAN 104 via SMF 222 or an API.

The number and arrangement of devices and networks shown in FIGS. 2A-2B are provided as an example. In practice, there may be additional devices and/or networks, fewer devices and/or networks, different devices and/or networks, or differently arranged devices and/or networks than those shown in FIGS. 2A-2B. Furthermore, two or more devices shown in FIGS. 2A-2B may be implemented within a single device, or a single device shown in FIGS. 2A-2B may be implemented as multiple, distributed devices.

Additionally, or alternatively, a set of devices (e.g., one or more devices) of FIGS. 2A-2B may perform one or more functions described as being performed by another set of devices of FIGS. 2A-2B.

Figure 3:
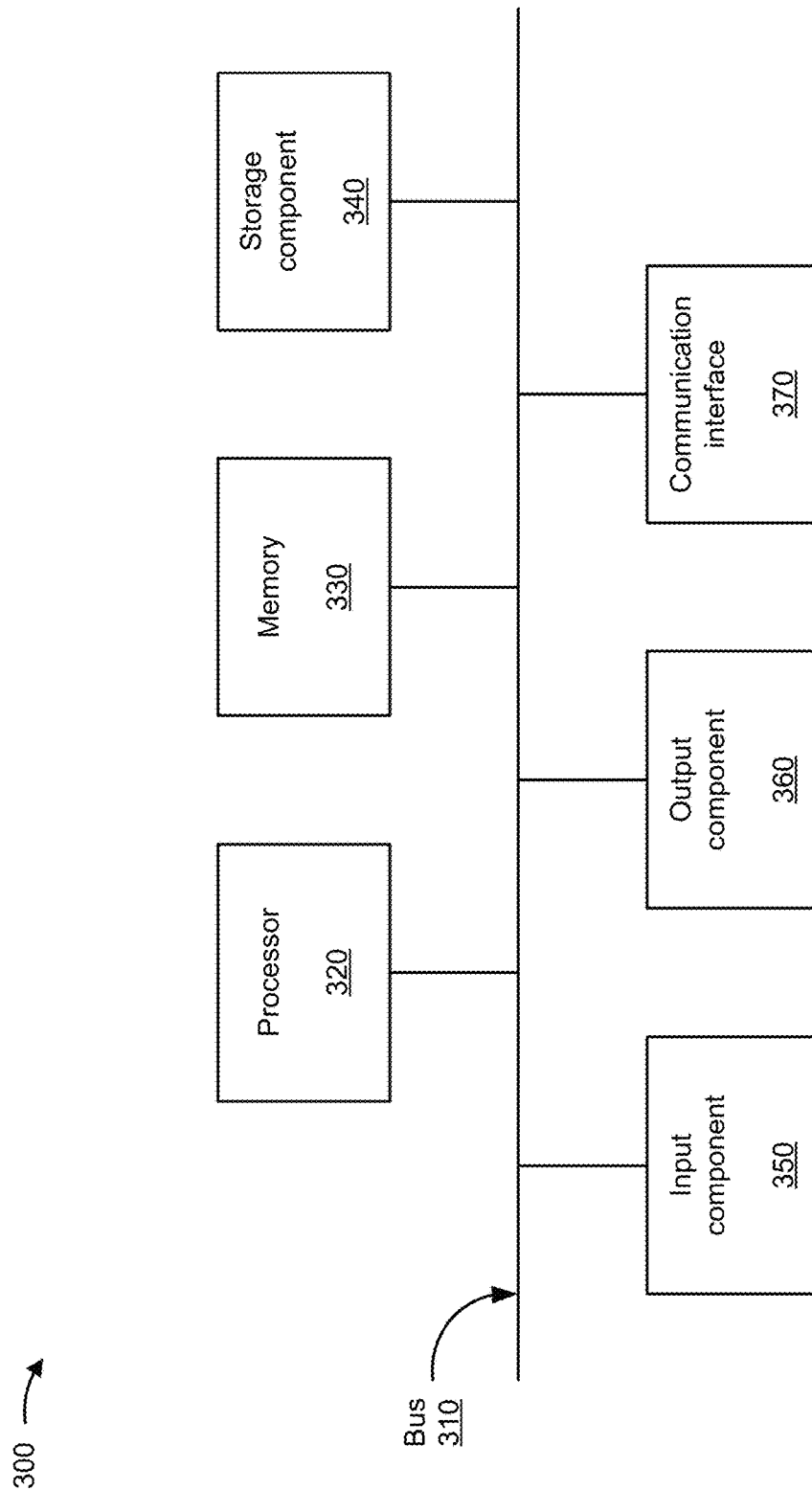
FIG. 3 is a diagram of example components of one or more devices of FIGS. 2A-2B.

FIG. 3 is a diagram of example components of a device 300. Device 300 may correspond to UE 102, application server 108, FW 110, HSS 112, MME 114, SCEF 116, SGW 118, PGW 120, NSSF 208, NEF 210, AUSF 212, UDM 214, PCF 216, AF 218, AMF 220, SMF 222, and/or UPF 224. In some implementations, UE 102, application server 108, FW 110, HSS 112, MME 114, SCEF 116, SGW 118, PGW 120, NSSF 208, NEF 210, AUSF 212, UDM 214, PCF 216, AF 218, AMF 220, SMF 222, and/or UPF 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
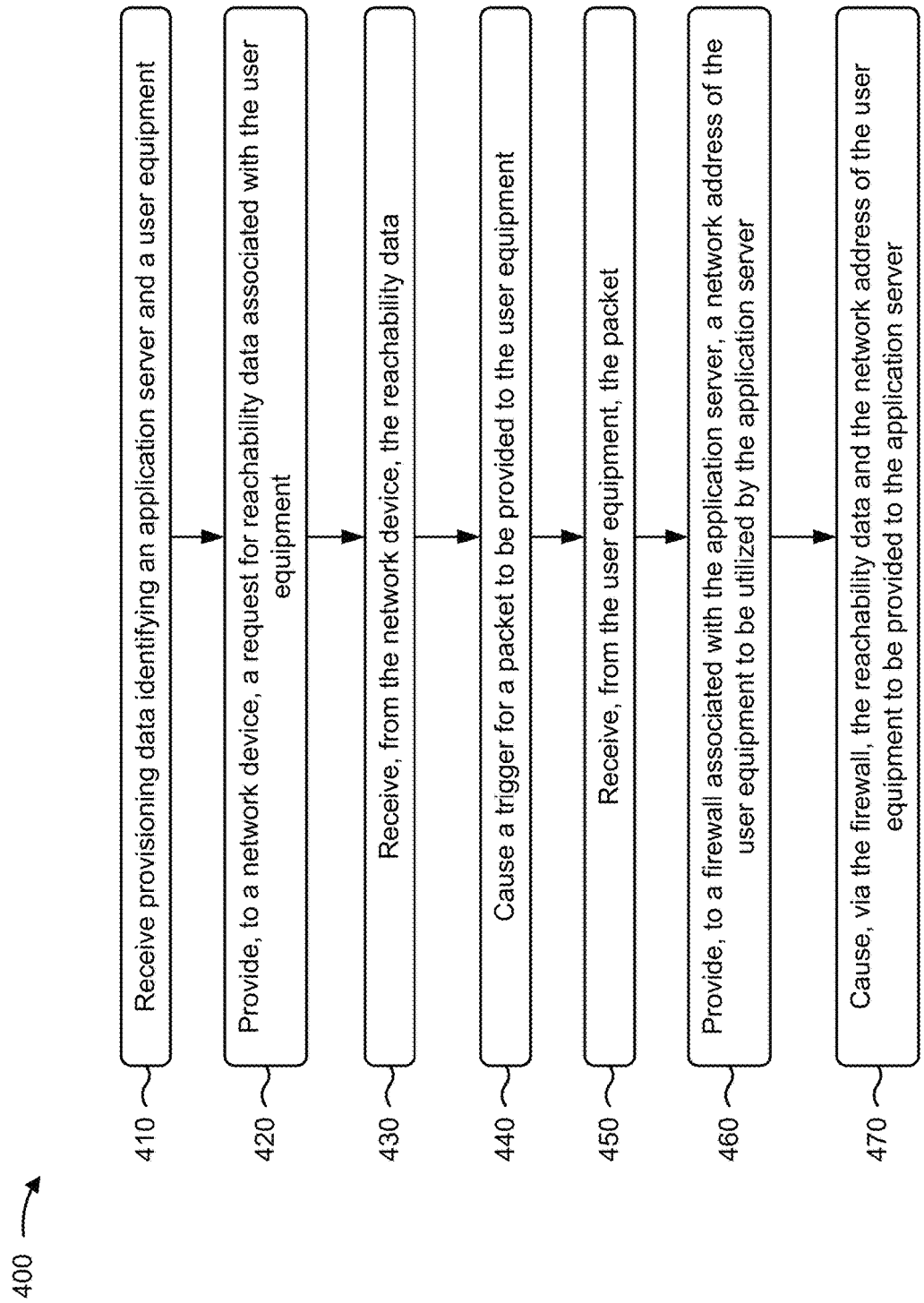
FIG. 4 is a flow chart of an example process relating to facilitating data transmission to internet of things devices.

FIG. 4 is a flow chart of an example process 400 for systems and methods for providing dynamic managed internet protocol service for low-power wide-area network internet of things devices. In some implementations, one or more process blocks of FIG. 4 may be performed by a device (e.g., SCEF 116, NEF 210, and/or the like). In some implementations, one or more process blocks of FIG. 4 may be performed by another device or a group of devices separate from or including the device, such as a user equipment (e.g., user equipment 102), an application server (e.g., application server 108), a FW (e.g., FW 110), an HSS (e.g., HSS 112), an MME (e.g., MME 114), an SGW (e.g., SGW 118), a PGW (e.g., PGW 120), an NSSF (e.g., NSSF 208), an AUSF (e.g., AUSF 212), a UDM (e.g., UDM 214), a PCF (e.g., PCF 216), an AF (e.g., AF 218), an AMF (e.g., AMF 220), an SMF (e.g., SMF 222), a UPF (e.g., UPF 224), and/or the like.

As shown in FIG. 4, process 400 may include receiving provisioning data identifying an application server and a user equipment (block 410). For example, the device (e.g., using processor 320, memory 330, storage component 340, input component 350, output component 360, communication interface 370, and/or the like) may receive the provisioning data identifying the application server and the user equipment, as described above. The provisioning data may identify a firewall associated with the application server. The device may include a service capability exposure function. The user equipment may include an internet of things (IoT) device that is associated with a low-power wide-area network.

As further shown in FIG. 4, process 400 may include providing, to a network device, a request for reachability data associated with the user equipment (block 420). For example, the device (e.g., using processor 320, memory 330, storage component 340, input component 350, output component 360, communication interface 370, and/or the like) may provide, to the network device, the request for reachability data associated with the user equipment, as described above. The reachability data associated with the user equipment may include at least one of a power saving mode schedule, an extended discontinuous reception schedule, a current reachability status of the user equipment, a last reachable date and/or time associated with the user equipment, a next reachable date and/or time associated with the user equipment, a last disconnect date and/or time associated with the user equipment, or a next disconnect date and/or time associated with the user equipment.

As further shown in FIG. 4, process 400 may include receiving, from the network device, the reachability data (block 430). For example, the device (e.g., using processor 320, memory 330, storage component 340, input component 350, output component 360, communication interface 370, and/or the like) may receive, from the network device, the reachability data associated with the user equipment based on the request for the reachability data, as described above.

As further shown in FIG. 4, process 400 may include causing a trigger for a packet to be provided to the user equipment (block 440). For example, the device (e.g., using processor 320, memory 330, storage component 340, input component 350, output component 360, communication interface 370, and/or the like) may cause the trigger for the packet to be provided to the user equipment, as described above. Process 400 may include causing the user equipment to assign a network address of the user equipment and a port identifier of a port of the user equipment to be utilized by the application server based on the trigger for the packet.

As further shown in FIG. 4, process 400 may include receiving, from the user equipment, the packet (block 450). For example, the device (e.g., using processor 320, memory 330, storage component 340, input component 350, output component 360, communication interface 370, and/or the like) may receive, from the user equipment, the packet, as described above. The packet may include the network address of the user equipment and the port identifier of the port of the user equipment to be utilized by the application server. Receiving the packet may be via a message generated by the user equipment. The message may be a short message service message.

As further shown in FIG. 4, process 400 may include providing, to the firewall associated with the application server, the network address of the user equipment to be utilized by the application server (block 460). For example, the device (e.g., using processor 320, memory 330, storage component 340, input component 350, output component 360, communication interface 370, and/or the like) may provide, to the firewall associated with the application server, the network address of the user equipment to be utilized by the application server, as described above. Process 400 may include providing, to the firewall associated with the application server, an identifier of the user equipment, the network address of the user equipment, and the port identifier of the port of the user equipment to be utilized by the application server. Providing the identifier of the user equipment, the network address of the user equipment, and the port identifier of the port of the user equipment may include updating the firewall with the identifier of the user equipment, the network address of the user equipment, and the port identifier of the port of the user equipment to be utilized by the application server. In some implementations, providing the identifier of the user equipment, the network address of the user equipment, and the port identifier of the port of the user equipment may include updating a dynamic domain name system data structure, associated with the firewall, with the identifier of the user equipment, the network address of the user equipment, and the port identifier of the port of the user equipment to be utilized by the application server. The firewall may be associated with an external address and an external port that enables the application server to communicate with the user equipment via customer premise equipment.

As further shown in FIG. 4, process 400 may include causing, via the firewall, the reachability data and the network address of the user equipment to be provided to the application server (block 470). For example, the device (e.g., using processor 320, memory 330, storage component 340, input component 350, output component 360, communication interface 370, and/or the like) may cause, via the firewall, the reachability data and the network address of the user equipment to be provided to the application server, as described above. Process 400 may include causing, via the firewall, the reachability data associated with the user equipment, the network address of the user equipment, and the port identifier of the port of the user equipment to be provided to the application server to enable the application server to provide data to the user equipment Process 400 may include receiving a request to assign a network prefix for the user equipment and assigning the network address for the user equipment. In some implementations, process 400 may include causing the user equipment to initiate a setup of a packet data network connection based on the trigger for the packet.

Process 400 may include causing the application server to provide the data to the user equipment based on the reachability data indicating that the IoT device is awake and ready to receive the data from the application server, or causing the application server to refrain from providing the data to the user equipment based on the reachability data indicating that the user equipment is unable to receive the data from the application server. In some implementations, process 400 may include causing the application server to provide the data to the user equipment based on providing the identifier of the user equipment, the network address of the user equipment, and the port identifier of the port of the user equipment to the firewall.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device of a network, provisioning data identifying an application server, a firewall associated with the application server, and a user equipment;
   providing, by the device, a request for reachability data associated with the user equipment;
   receiving, by the device, the reachability data associated with the user equipment based on the request for the reachability data;
   causing, by the device, the user equipment to assign a network address of the user equipment and a port identifier of a port of the user equipment to be utilized by the application server;
   receiving, by the device, a packet that includes the network address of the user equipment and the port identifier of the port of the user equipment;
   providing, by the device, an identifier of the user equipment, the network address of the user equipment, and the port identifier of the port of the user equipment; and
   causing, by the device via the firewall, the reachability data associated with the user equipment, the network address of the user equipment, and the port identifier of the port of the user equipment to be provided to the application server.

2. The method of claim 1, further comprising:
   receiving, by the device, a request to assign a network prefix for the user equipment; and
   assigning, by the device, the network prefix for the user equipment based on the request to assign the network prefix.

3. The method of claim 1, further comprising:
   causing, by the device, a trigger for the packet to be provided to the user equipment; and
   wherein causing the user equipment to assign the network address of the user equipment and the port identifier of the port of the user equipment is based on the trigger for the packet.

4. The method of claim 1, wherein receiving the packet comprises:
   receiving the packet via a short message service message generated by the user equipment.

5. The method of claim 1, wherein providing the identifier of the user equipment, the network address of the user equipment, and the port identifier of the port of the user equipment comprises:
   updating a dynamic domain name system data structure, associated with the firewall, with the identifier of the user equipment, the network address of the user equipment, and the port identifier of the port of the user equipment.

6. The method of claim 1, further comprising:
   causing, by the device, the application server to provide the data to the user equipment based on providing the identifier of the user equipment, the network address of the user equipment, and the port identifier of the port of the user equipment to the firewall.

7. The method of claim 1, wherein the user equipment includes an internet of things device.

8. The method of claim 1, wherein the reachability data associated with the user equipment includes at least one of a power saving mode schedule, an extended discontinuous reception schedule, a current reachability status of the user equipment, a last reachable date and/or time associated with the user equipment, a next reachable date and/or time associated with the user equipment, a last disconnect date and/or time associated with the user equipment, or a next disconnect date and/or time associated with the user equipment.

9. A device, comprising:
   one or more processors, configured to:
   receive provisioning data identifying an application server and an internet of things (IoT) device;
   provide, to a network device of a network associated with the device, a request for reachability data associated with the IoT device;
   receive, from the network device, the reachability data associated with the IoT device based on the request for the reachability data;
   cause the IoT device to assign a network address of the IoT device and a port identifier of a port of the IoT device to be utilized by the application server;
   receive, from the IoT device, a packet that includes the network address of the IoT device and the port identifier of the port of the IoT device;
   provide, to a firewall associated with the application server, an identifier of the IoT device, the network address of the IoT device, and the port identifier of the port of the IoT device; and
   cause, via the firewall, the reachability data associated with the IoT device, the network address of the IoT device, and the port identifier of the port of the IoT device to be provided to the application server to enable the application server to provide data to the IoT device.

10. The device of claim 9, wherein the one or more processors are further configured to:
receive a request to assign a network prefix for the IoT device; and
assign the network prefix for the IoT device based on the request to assign the network prefix.

11. The device of claim 9, wherein the one or more processors are further configured to:
cause a trigger for the packet to be provided to the IoT device; and
wherein the one or more processors, when causing the IoT device to assign the network address of the IoT device and the port identifier of the port of the IoT device, cause the IoT device to assign the network address of the IoT device and the port identifier of the port of the IoT device based on the trigger for the packet.

12. The device of claim 9, wherein the device includes a service capability exposure function or a network exposure function.

13. The device of claim 9, wherein the one or more processors are further configured to:
cause the IoT device to initiate a setup of a packet data network connection.

14. The device of claim 9, wherein the firewall is associated with an external address and an external port that enables the application server to communicate with the IoT device via customer premise equipment.

15. The device of claim 9, wherein the one or more processors are further configured to:
cause the application server to provide the data to the IoT device based on the reachability data indicating that the IoT device is awake and ready to receive the data from the application server, or
cause the application server to refrain from providing the data to the IoT device based on the reachability data indicating that the IoT device is unreachable and unable to receive the data from the application server.

16. A non-transitory computer-readable medium storing instructions, the instructions comprising:
one or more instructions that, when executed by one or more processors of a device of a network, cause the one or more processors to:
receive provisioning data identifying an application server and a user equipment;
provide, to a network device, a request for reachability data associated with the user equipment;
receive, from the network device, the reachability data associated with the user equipment based on the request for the reachability data;
cause the user equipment to assign a network address of the user equipment and a port identifier of a port of the user equipment to be utilized by the application server;
receive, via a message generated by the user equipment, a packet that includes the network address of the user equipment and the port identifier of the port of the user equipment;
update a firewall with an identifier of the user equipment, the network address of the user equipment, and the port identifier of the port of the user equipment; and
cause, via the firewall, the reachability data associated with the user equipment, the network address of the user equipment, and the port identifier of the port of the user equipment to be provided to the application server to enable the application server to provide data to the user equipment.

17. The non-transitory computer-readable medium of claim 16, wherein the one or more instructions, when executed by the one or more processors, further cause the one or more processors to:
cause a trigger for the packet to be provided to the user equipment; and
wherein the one or more instructions, that cause the one or more processors to cause the user equipment to assign the network address of the user equipment and the port identifier of the port of the user equipment, cause the user equipment to assign the network address of the user equipment and the port identifier of the port of the user equipment based on the trigger for the packet.

18. The non-transitory computer-readable medium of claim 16, wherein the user equipment includes an internet of things device and the device includes a service capability exposure function or a network exposure function.

19. The non-transitory computer-readable medium of claim 16, wherein the one or more instructions, when executed by the one or more processors, further cause the one or more processors to:
receive a request to assign a network prefix for the user equipment; and
assign the network prefix for the user equipment based on the request to assign the network prefix.

20. The non-transitory computer-readable medium of claim 16, wherein the one or more instructions, when executed by the one or more processors, further cause the one or more processors to one of:
cause the application server to provide the data to the user equipment based on the reachability data indicating that the user equipment is awake and ready to receive the data from the application server, or
cause the application server to refrain from providing the data to the user equipment based on the reachability data indicating that the user equipment is unable to receive the data from the application server.

* * * * *